Patented Jan. 9, 1940

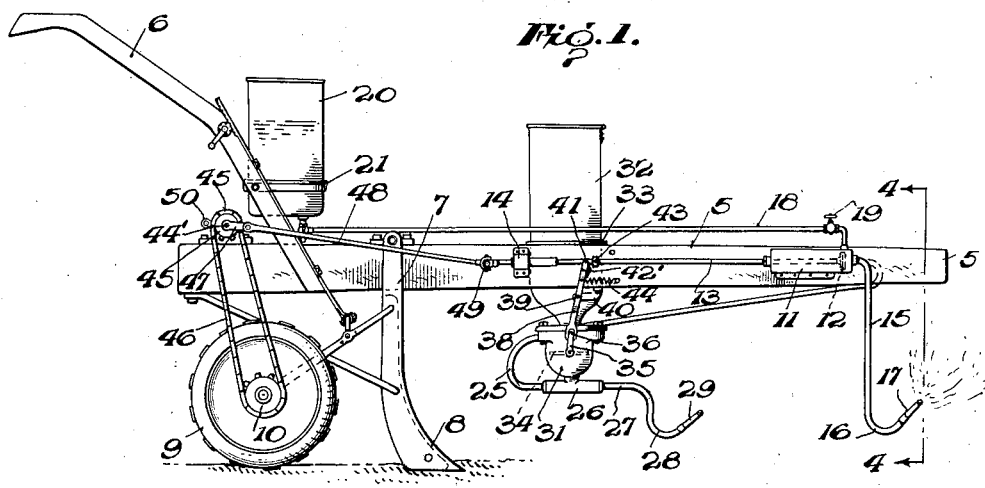

2,186,868

UNITED STATES PATENT OFFICE 2,186,868

INSECT EXTERMINATOR

Eddie R. Jowers, Swansea, S. C.

Application December 8, 1937, Serial No. 178,801
Renewed June 29, 1939

4 Claims. (Cl. 43—147)

My invention relates to insect exterminators.

An important object of the invention is to provide apparatus of the above mentioned character for exterminating insects, such as the boll weevil, by first spraying the cotton plant with water followed by spraying the same with a powdered insecticide, such as arsenic.

A further object of the invention is to provide apparatus of the above mentioned character which will spray the powdered insecticide in an upward direction so that the powder will be applied, to a considerable extent, to the lower surfaces of the leaves, to avoid the powder being washed off by the rain, as much as possible.

A further object of the invention is to provide apparatus of the above mentioned character which may be drawn down a row of plants and will operate automatically both in spraying water and in spraying the powdered insecticide.

A further object of the invention is to provide apparatus of the above mentioned character which may be applied to a cultivator.

Other objects and advantages of the invention will be apparent during the course of the following description.

In the accompanying drawing forming a part of this application and in which like numerals are employed to designate like parts throughout the same, Figure 1 is a side elevation of apparatus embodying my invention, Figure 2 is a perspective view of the same, Figure 3 is a side elevation of the insecticide hopper, parts in section, Figure 4 is a transverse section taken on line 4—4 of Figure 1.

In the drawing, wherein for the purpose of illustration is shown a preferred embodiment of my invention, the numeral 5 designates the beam of the cultivator, having handles 6 secured to its rear end. Depending from the beam 5 is the usual stock 7 carrying the plowshare 8. The numeral 9 designates a traction wheel, suitably connected with the stock 7 and preferably equipped with a pneumatic tire. This traction wheel has a sprocket wheel 10 mounted to turn therewith.

Mounted upon one side of the beam 5 near its forward end is a water spraying pump including a horizontal cylinder 11, having a plunger 12 reciprocating therein. This plunger is operated by a horizontal reciprocatory rod 13, the rear end of which operates in a guide 14, rigidly attached to the same side of the beam 5 with the cylinder 11. An outlet pipe 15 is connected with the forward end of the cylinder 11 and extends downwardly beyond the cylinder in a substantially vertical direction and is then bent upwardly and laterally, as shown at 16 and is equipped with a spraying nozzle 17. Water is supplied to the top of the cylinder 11 near its forward end, by a pipe 18, leading into the cylinder 11 and an adjustable valve 19 is connected in the pipe 18 to regulate the spray of water. The pipe 18 extends longitudinally of and above the beam 5 and leads into the bottom of a vertical water tank 20, suitably supported upon the handles 11 by a strap 21 or the like.

A compressed air supply pump is provided and mounted upon the opposite side of the beam 5 with respect to the cylinder 11 and near the forward end of the beam. This compressed air supply pump includes a horizontal cylinder 22, mounted upon the beam 5. A plunger 23 is mounted to reciprocate within the cylinder 22 and is moved by a reciprocatory rod 24 extending longitudinally of and above the beam 5. Connected with the forward end of the cylinder 22 is a pipe 25, extending rearwardly, and having its discharge end connected with a T-coupling 26. The opposite end of this T-coupling is connected with a pipe 27, extending downwardly in a vertical direction, as shown at 28 and then bent upwardly and carrying a spraying nozzle 29. The vertical arm 30 of the T-coupling leads into the lower end of a vertical chamber 31, and this chamber is attached to the bottom of a hopper 32, for holding the powdered insecticide, such as powdered arsenic. The hopper 32 is mounted upon the beam 5 by any suitable means, such as by a strap 33.

Extending transversely within the chamber 31 is a horizontal rock shaft 33', having a disc valve 34 rigidly mounted thereon. When this disc valve is in the horizontal position, it has substantially an air tight fit within the chamber 31 and therefore seals or covers the lower portion of the chamber. When tilted from the horizontal position, it will fill the lower portion of the chamber 31 with the powdered insecticide. Connected with the outer end of the rock shaft 33' is a crank 35, carrying a pin 36, adapted to operate within an elongated slot 37 formed in a vertically swinging lever 38, pivoted between its ends at 39, upon the stationary bracket 40, rigidly mounted upon the beam 5.

The upper end of the lever 38 is provided with a finger 41, hinged thereto at 42 and swung in one direction by a spring 42' and adapted to brake forwardly only. The finger 41 is forked to receive the reciprocatory rod 13 which operates the plunger 12 of the water pump. This rod has a trip 43 rigidly secured thereto. The lever 38 is returned to the normal starting position, to close the disc valve 34, when released, by a spring 44.

The means to operate the plungers 12 and 23 comprises a transverse rotary shaft 44', suitably mounted upon the rear end of the beam 5, and this shaft is equipped with a sprocket wheel 45, rigidly mounted thereon, and driven by a sprocket chain 46, engaging the sprocket wheel 10. A crank 47 is rigidly mounted upon one end of the shaft 44' and has pivotal connection with a connecting rod 48, extending forwardly for connection by means of a universal joint 49, with the rod 13. A crank 50 is rigidly mounted upon the shaft 44' and has pivotal connection with a connecting link 51 connected with the rod 24 by a universal joint 51'. The cranks 47 and 50 are disposed at 180° from each other. When the plunger 12 is in the forwardmost position, the plunger 23 is in the rearmost position. The cylinders 11 and 22 and the rods 13 and 24 extend longitudinally of the beam 5.

The operation of the apparatus is as follows.

The machine is drawn down between two rows of cotton plants or the like and travels upon one side of a given row, and the nozzles 17 and 29 travel near the ground and are directed upwardly and laterally toward the row of plants being treated. As the machine travels down the row, traction wheel 9 rotates turning shaft 44', which causes the plungers 12 and 23 to reciprocate, as is obvious. When the plunger 12 is in the rearmost position and during its forward and rearward movements, water is supplied from the pipe 18 into the cylinder 11, the amount of water being regulated by the adjustment of the valve 19, so that the water is supplied in a small stream. Upon the rearward movement of the plunger 12, air will be drawn into the cylinder 11 through the pipe 15, and when the plunger 12 moves forwardly, this air, with the water, the cylinder 11 being only partly filled with water, will be forced through the pipe 15 and the water sprayed through the nozzle 17. When the plunger 12 is in the forwardmost position, the plunger 23 is in the rearmost position, and the valve disc 34 is in the closed position and air has been drawn into the cylinder 22. When the plunger 12 starts upon its rearward movement, trip 43 engages the finger 41 and the lever 38, turning the upper end of the lever 38 rearwardly, and this lever and associated elements tilt the disc valve 34 so that the powdered insecticide passes into the lower end of the chamber 31. By the time the plunger 12 moves a short distance rearwardly, the trip 43 disengages finger 41 and the spring 44 quickly returns the lever 38 to the normal position closing valve disc 34. As the plunger 12 continues to move rearwardly, the plunger 23 is moved forwardly. The plunger 23 will compress the air in the cylinder 22 and force the same through the pipe 25 into the coupling 26 and through the pipe 28 and through the nozzle 29. The powdered insecticide within the lower end of the chamber 31 will drop into the horizontal arm of the coupling 26, and also will be drawn into the same by the suction action of the air traveling through the pipe 27. The powder and the air is therefore sprayed through the nozzle 29.

My machine is so arranged that the water is first applied to the leaves of the plant, upon the under surfaces of the leaves to a considerable extent and the powdered insecticide is then sprayed upon the wet leaves, upon their lower surfaces, to a considerable extent. This will insure that the powdered insecticide will adhere to the leaves and will not be readily washed off by the rain.

It is to be understood that the form of my invention herewith shown and described is to be taken as a preferred example of the same and that various changes in the shape, size, and arrangement of parts, may be resorted to without departing from the spirit of my invention or the scope of the subjoined claims.

Having thus described my invention, I claim:

1. An insect exterminator comprising, a support, cylinders mounted upon the support, plungers mounted to reciprocate within the cylinders, means to move the plungers, means to supply water to one cylinder, an outlet pipe connected with the water receiving cylinder, an outlet pipe connected with the other cylinder, a powder receiving receptacle connected with the last named outlet pipe, an outlet pipe connected with the powder receiving receptacle, and means to supply powder into the powder receiving receptacle and operated by the movement of the plunger in the water receiving cylinder.

2. An insect exterminator comprising, a water pump having spraying outlet means, an air pump, a powder receiving receptacle receiving air from the air pump, spraying outlet means connected with the powder receiving receptacle, means for controlling the supply of powder into the powder receiving receptacle and being operated by the water pump, and means to operate the air pump and the water pump.

3. An insect exterminator comprising, a water pump including a cylinder and plunger therein, spraying outlet means for the cylinder, an air pump including a cylinder and plunger therein, a powder receiving receptacle having communication with the cylinder of the air pump, outlet spraying means connected with the receptacle, rods connected with the plungers, means to move the rods in opposite directions, a valve for supplying powder to the receptacle, and an element to operate the valve and operated by the rod of the water pump.

4. An insect exterminator comprising, a water pump including a cylinder and plunger therein, spraying outlet means for the cylinder, an air pump including a cylinder and plunger therein, a powder receiving receptacle having communication with the cylinder of the air pump, outlet spraying means for the receptacle, rods connected with the plungers, a shaft having cranks arranged at substantially 180° apart and connected with the rods, a valve for controlling the supply of powder to the receptacle, an element connected with the valve to move it, and a trip connected with the rod of the water pump to actuate the element.

EDDIE R. JOWERS.